United States Patent
Lin

(10) Patent No.: US 7,305,771 B2
(45) Date of Patent: Dec. 11, 2007

(54) ROTATION SENSOR

(75) Inventor: Tzu Chih Lin, Hsinchu (TW)

(73) Assignee: Altek Corporation, Hsinchu (TW)

( * ) Notice: Subject to any disclaimer, the term of this patent is extended or adjusted under 35 U.S.C. 154(b) by 0 days.

(21) Appl. No.: 11/376,224

(22) Filed: Mar. 16, 2006

(65) Prior Publication Data

US 2007/0214667 A1    Sep. 20, 2007

(51) Int. Cl.
G01C 9/06    (2006.01)
G01C 9/12    (2006.01)

(52) U.S. Cl. ............ 33/366.24; 33/366.11; 33/391

(58) Field of Classification Search .......... 33/1 PT, 33/301–401
See application file for complete search history.

(56) References Cited

U.S. PATENT DOCUMENTS

| | | | | |
|---|---|---|---|---|
| 828,521 A * | 8/1906 | Sinclair | ............ | 33/392 |
| 1,654,964 A * | 1/1928 | Crumbach et al. | ............ | 33/400 |
| 2,600,363 A * | 6/1952 | Morris | ............ | 33/366.24 |
| 3,079,697 A * | 3/1963 | Lunde | ............ | 33/366.24 |
| 3,791,042 A * | 2/1974 | Bell | ............ | 33/366.24 |
| 3,805,398 A * | 4/1974 | Russell et al. | ............ | 33/366.11 |
| 3,975,831 A * | 8/1976 | Jysky et al. | ............ | 33/395 |
| 4,277,895 A * | 7/1981 | Wiklund | ............ | 33/366.14 |
| 5,740,881 A * | 4/1998 | Lensak | ............ | 33/366.11 |
| 6,282,804 B1 * | 9/2001 | Jiang | ............ | 33/366.21 |
| 6,708,416 B1 * | 3/2004 | Havens et al. | ............ | 33/366.24 |
| 2005/0198846 A1 * | 9/2005 | Nagata | ............ | 33/366.11 |
| 2006/0137199 A1 * | 6/2006 | Ikuta | ............ | 33/366.24 |

* cited by examiner

*Primary Examiner*—G. Bradley Bennett
(74) *Attorney, Agent, or Firm*—Rosenberg, Klein & Lee

(57) ABSTRACT

A rotation sensor comprising a Y-shaped strip and a conducting strip is disposed in a digital imaging device. The conducting strip is disposed below the Y-shaped strip. The Y-shaped strip has two sensing arms and a fixed arm. A metal piece is disposed on each of the two sensing arms. When the sensing arm hangs down due to the weight of the metal piece to touch the conducting strip, the Y-shaped strip and the conducting strip will form a closed circuit and send out a signal. Whether the digital imaging device is rotated is determined based on this signal. Whether the device body is horizontal or vertical can thus be accurately and quickly determined. Moreover, because the detection is accomplished through gentle deformation or rotation of the sensing arms, there will be no noise during the detection process.

10 Claims, 7 Drawing Sheets

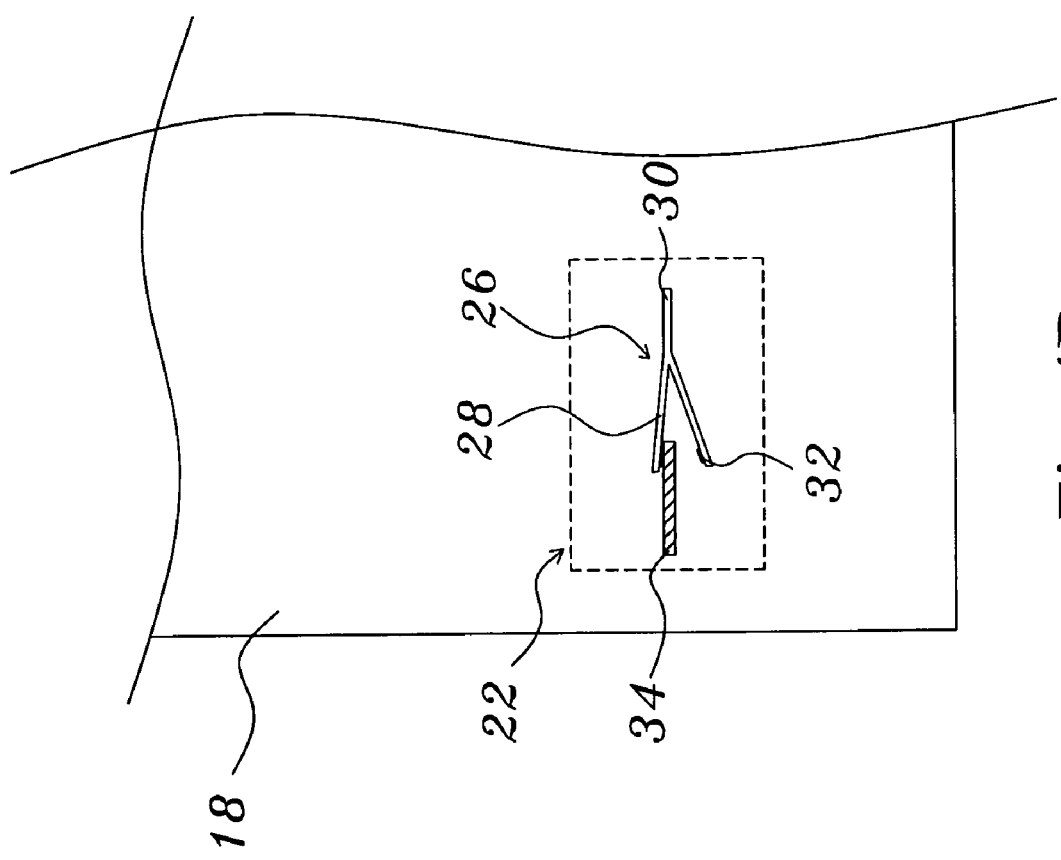

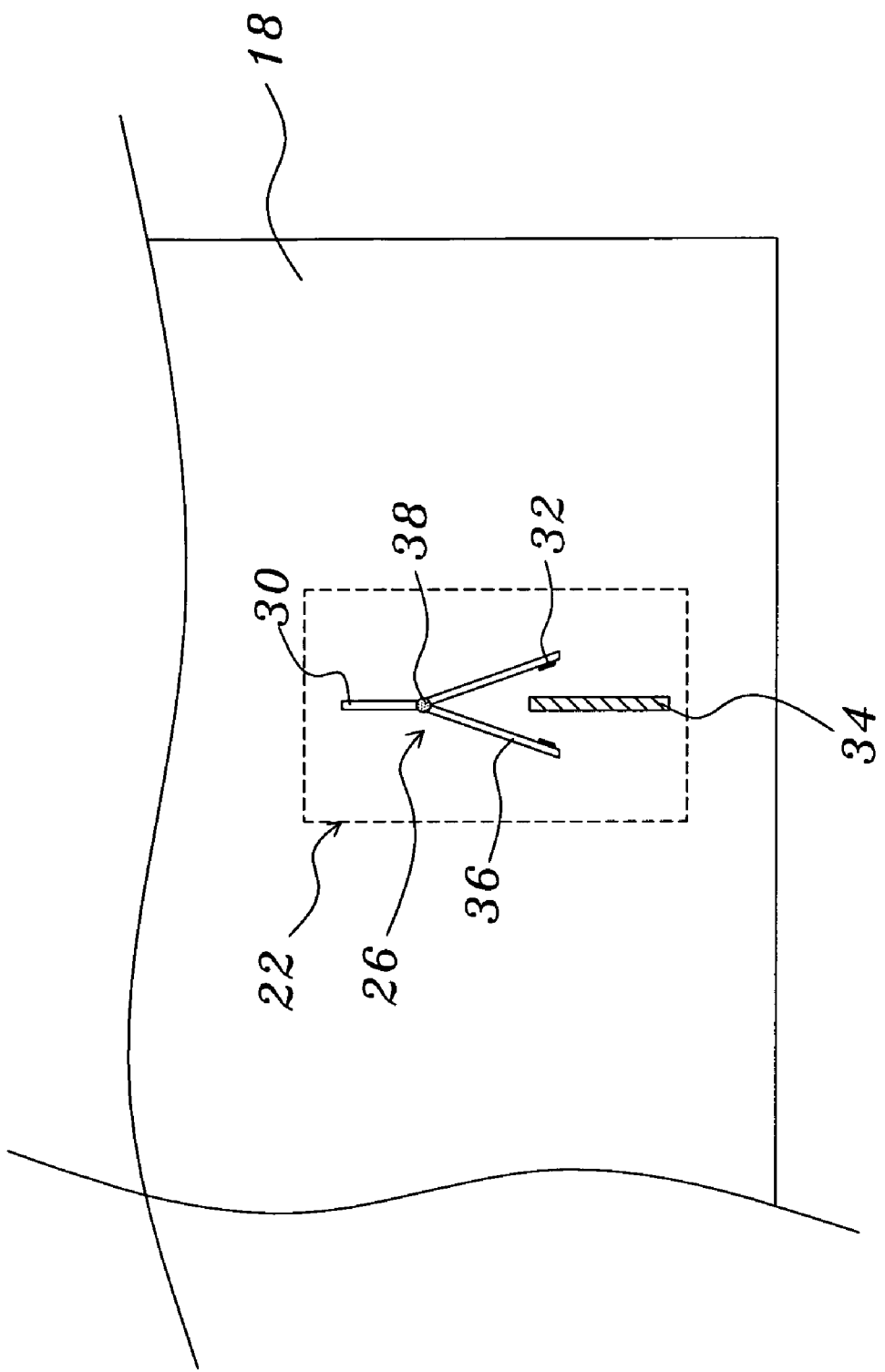

ROTATION SENSOR

BACKGROUND OF THE INVENTION

1. Field of the Invention

The present invention relates to a sensor and, more particularly, to a rotation sensor applied to digital imaging devices.

2. Description of Related Art

In recent years, owing to the continual progress of electronic technologies, digital photography products such as mobile phones, digital cameras and digital camcorders have become indispensable articles in everyday lives of many people. A digital camcorder or a digital camera with the video-capturing function can simultaneously record image and sound to allow people to recall the situation at that time through the cooperation of image and sound.

Among various digital imaging devices, digital cameras are the most popular. When one uses a conventional digital camera, he can only take pictures in accordance with the set horizontal or vertical angle of the viewfinder window and the LCD screen of the digital camera. Therefore, the storage of digital image frames depends on the angle of the digital camera relative to the horizontal direction of the camera body at the time when taking pictures. If the user holds the digital camera in the horizontal direction to capture images, the photographed sceneries in the stored image frames will show a normal erected state. If the user holds the digital camera in the vertical direction to capture images, the photographed sceneries in the stored image frames will show a laid-down state. Therefore, when the user views the photographed images on the LCD screen of the digital camera or edits the photographed images on a display using a computer, the photographed sceneries will show an erected or a laid-down state according to the photographing angle. This not only will cause inconvenience and discomfort in image viewing, but will also result in visual misjudgment during image editing to affect the editing efficiency and effect.

Many manufacturers have added a rotation sensor in the digital camera to solve the above problem. The most common rotation sensor is shown in FIG. 1. A receiving room 12 is disposed on a circuit board 10 of a digital camera. Conducting strips 14 are disposed on all the walls of the receiving room 12. A metal bead 16 is placed in the receiving room 12. When the body of the digital camera is rotated, the metal bead 16 will roll with the rotation of the camera body to allow the metal bead 16 to touch the conducting strips 14. Through the detection of the conducting strips 14, the digital camera can know whether the camera body is horizontal or vertical when taking an image so as to store the taken picture into a corresponding image frame for accurate display of the taken image.

In addition to the picture-taking function, today's digital cameras usually have a video-capturing function and a sound-recording function. During the video-capturing process, however, the digital cameras will also record the rolling sound of the metal bead in the rotation sensor, hence generating noise during the video-capturing process. Besides, the rolling bead type rotation sensor will easily misjudge during detection because that the rolling speed of the metal bead is generally slower tan the photographing speed. Furthermore, the rolling bead type rotation sensor is complicated and expensive in structure and manufacturing cost, hence making digital cameras having the rotation sensor very expensive.

The present invention aims to propose a rotation sensor to solve the above problems in the prior art.

SUMMARY OF THE INVENTION

An object of the present invention is to provide a rotation sensor, whereby when the body of a digital imaging device is rotated, one sensing arm of a Y-shaped strip will touch a conducting strip due to gravity to form a closed circuit and send out a signal. Whether the device body is in the horizontal or vertical state can thus be accurately and quickly determined based on this signal when photographing.

Another object of the present invention is to provide a rotation sensor with a simple structure, a low manufacturing cost and a low material cost.

Yet another object of the present invention is to provide a rotation sensor, which accomplishes detection through gentle deformation or rotation of sensing arms. Therefore, there will be no noise during detection.

According to the present invention, a rotation sensor comprises a Y-shaped strip and a conducting strip. The Y-shaped strip has two sensing arms and a fixed arm for connecting the two sensing arms. A metal piece is disposed on each of the two sensing arms. The conducting strip is disposed below the Y-shaped strip and located between the two sensing arms. The Y-shaped strip and the conducting strip will form a closed circuit to send out a signal to a processor when the metal pieces on the two sensing arms touches the conducting strip so that the processor can determine the rotation state of a digital imaging device based on the signal.

BRIEF DESCRIPTION OF THE DRAWINGS

The various objects and advantages of the present invention will be more readily understood from the following detailed description when read in conjunction with the appended drawing, in which:

FIGS. 4A and 4B are structure diagrams according to a first embodiment of the present invention; and FIGS. 5A and 5B are structure diagrams according to a second embodiment of the present invention.

DETAILED DESCRIPTION OF THE PREFERRED EMBODIMENTS

A rotation sensor of the present invention is disposed in a digital imaging device to accurately and quickly determine whether the rotation state of the device body is horizontal or vertical when the body of the digital imaging device is rotated.

Figure 1:
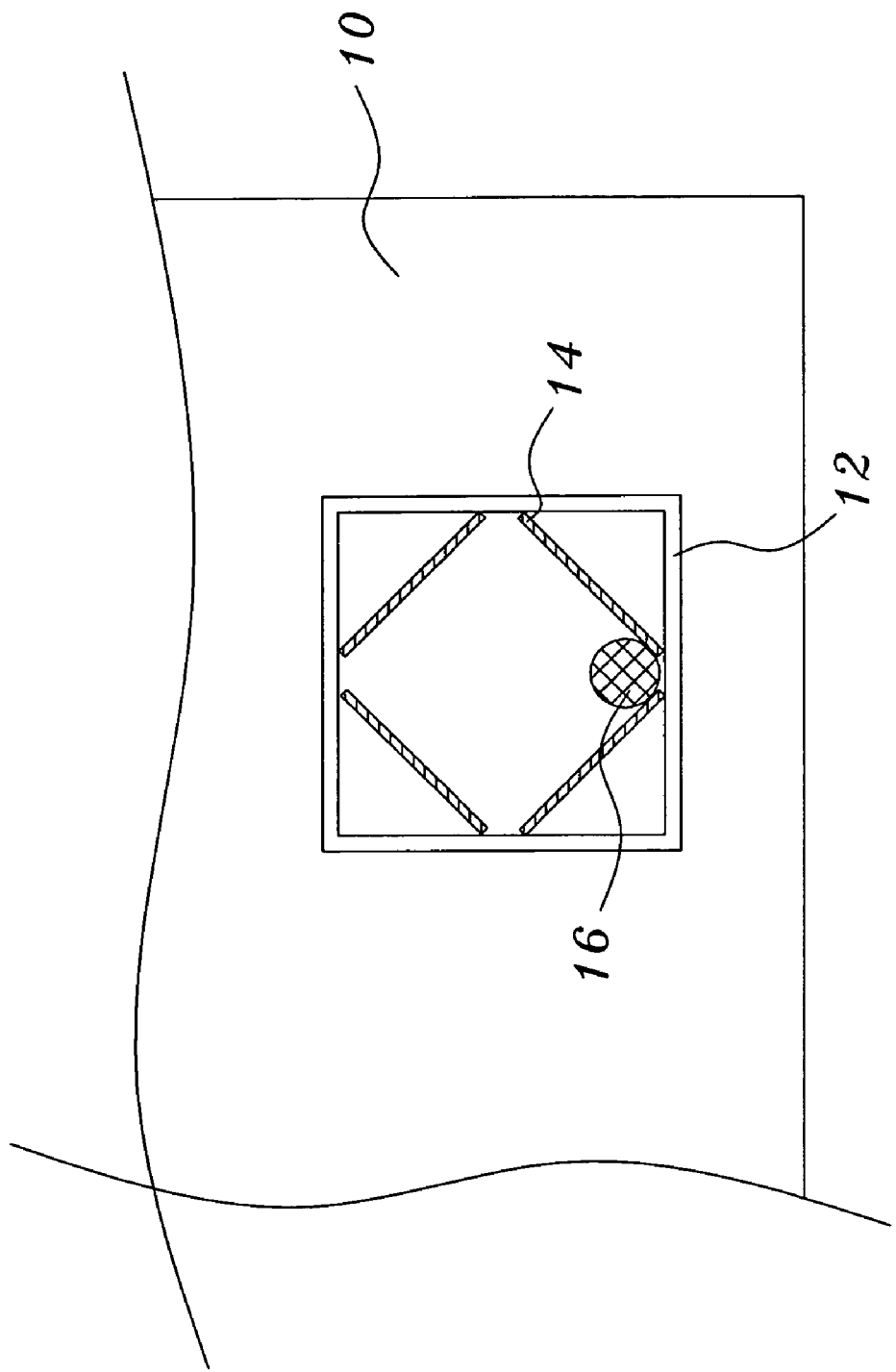
FIG. 1 is a structure diagram of a conventional rotation sensor.
Figure 2:
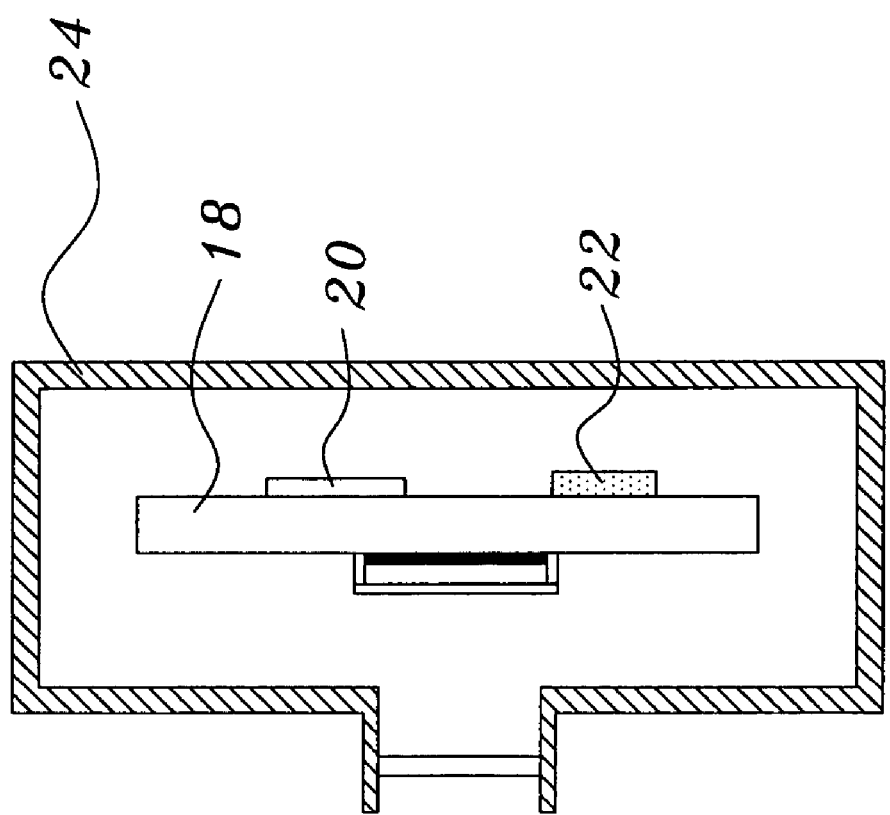
FIG. 2 shows a rotation sensor of the present invention disposed on a circuit board.
Figure 3:
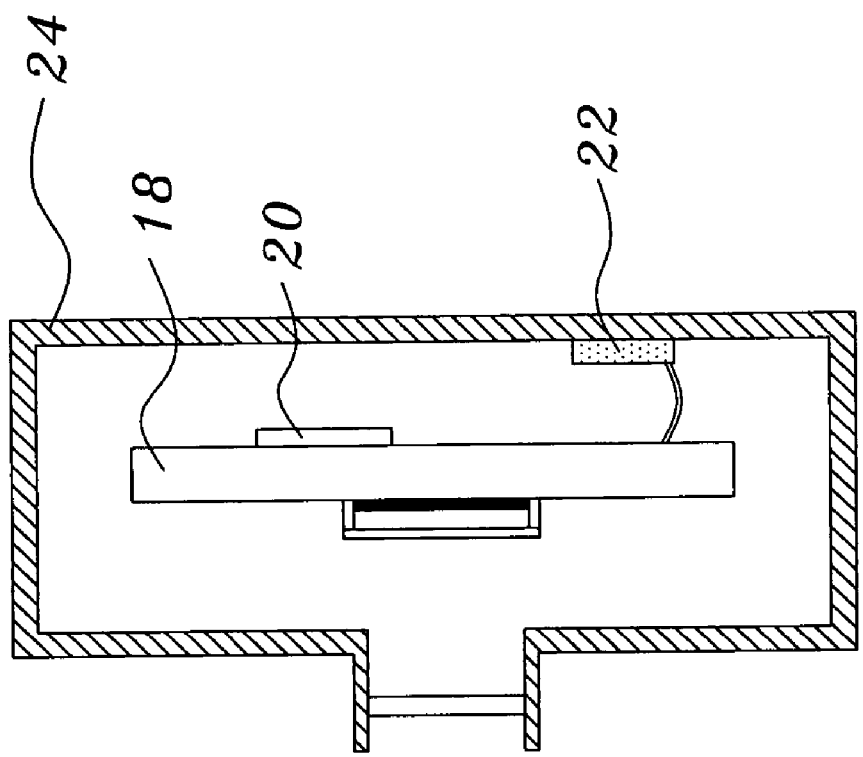
FIG. 3 shows a rotation sensor of the present invention disposed on a shell of a digital imaging device.

As shown in FIG. 2, the rotation sensor is disposed in a digital imaging device. The digital imaging device is a mobile phone, a digital camera, or a digital camcorder. The present invention is exemplified with a digital camcorder in the following two embodiments. The digital imaging device has the functions of picture taking, video capturing, and sound recording. A circuit board 18 is disposed in the digital camcorder. A processor 20 is disposed on the circuit board 18. The processor 20 is used to process the captured image and sound data. A rotation 22 is disposed on the circuit board 18. The rotation sensor 22 is electrically connected with the circuit board 18. Besides, the rotation sensor 22 can also be disposed on a shell 24 of the digital camcorder, as shown in FIG. 3. When the rotation sensor 22 is disposed on the shell 24, it is electrically connected to the circuit board 18 via a plurality of electric wires.

Figure 4A:
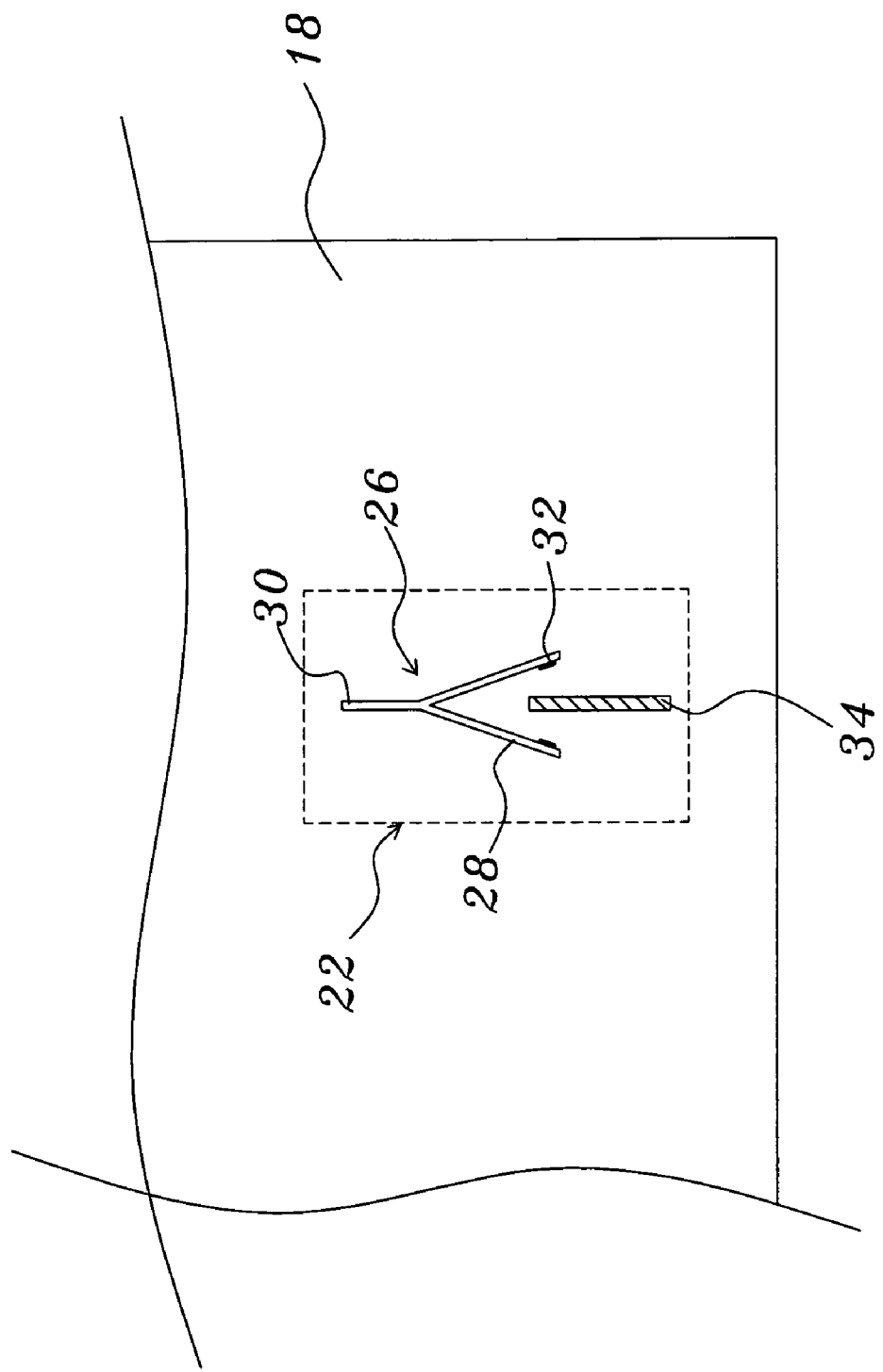

FIGS. 4A and 4B are structure diagrams according to a first embodiment of the present invention. The rotation sensor 22 is disposed on the circuit board 18. The rotation sensor 22 comprises a Y-shaped metal strip 26 and a conducting strip 34. The Y-shaped metal strip 26 has two elastic sensing arms 28 and a fixed arm 30. A metal piece 32 is disposed on each of the two elastic sensing arms 28. The metal pieces 32 are made of zinc, aluminum, or copper. The fixed arm 30 is fixed on and electrically connected with the circuit board 18. The conducting strip 34 is disposed below the Y-shaped metal strip 26 and between the two elastic sensing arms 28. The conducting strip 34 is also fixed on and electrically connected with the circuit board 18. When the digital camcorder is rotated to a certain specific angle, one of the elastic sensing arms 28 of the Y-shaped metal strip 26 will touch the conducting strip 34 due to the weight of the metal piece 32 thereon to form a closed circuit and send out a signal to the processor 20. The processor 20 bases on this signal to know the digital camcorder has been rotated. This specific angle is between 70 and 110 degrees. Moreover, the rotation direction of the digital camcorder can be divided into two cases: from the horizontal state to the vertical state or from the vertical state to the horizontal state. These two rotation states are both determined according to the set direction of the rotation sensor 22.

Figure 5B:
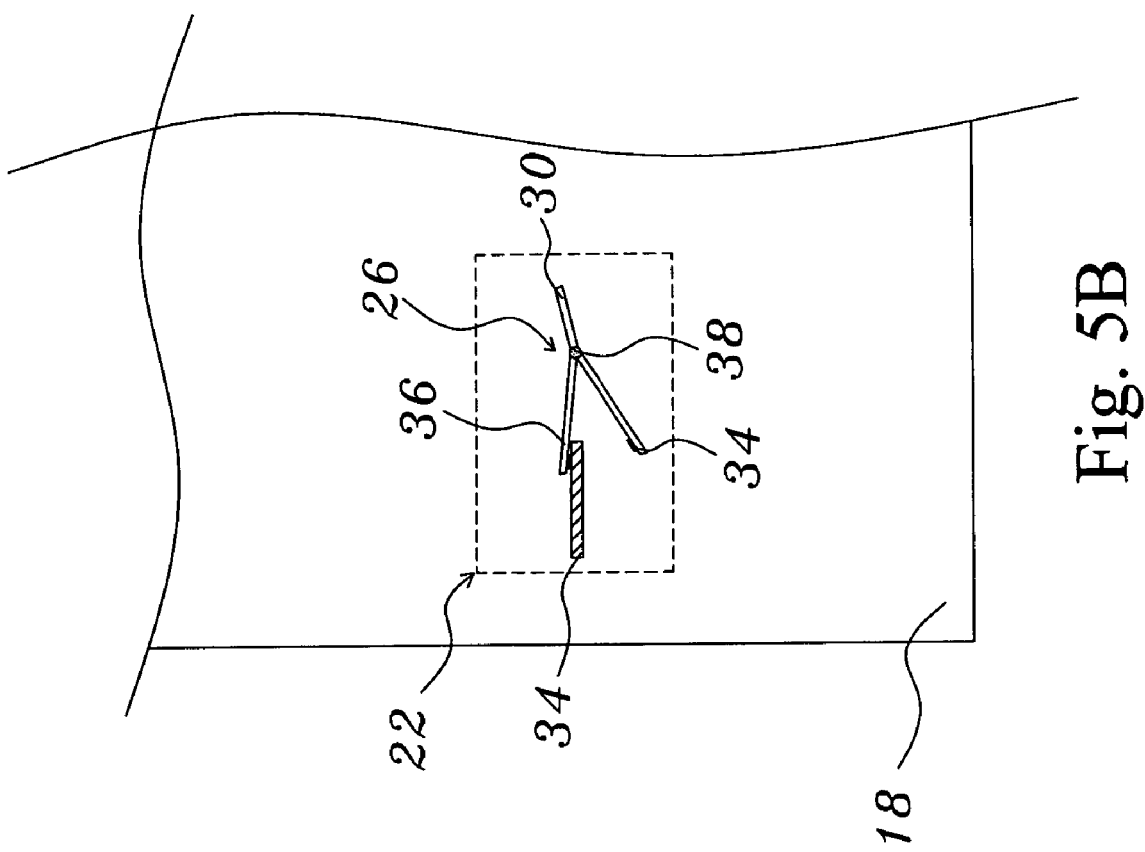

FIGS. 5A and 5B are structure diagrams according to a second embodiment of the present invention. The rotation sensor 22 is similarly disposed on the circuit board 18. The rotation sensor 22 comprises a Y-shaped metal strip 26 and a conducting strip 34. The Y-shaped metal strip 26 has two inflexible sensing arms 36 and a fixed arm 30. The Y-shaped metal strip 26 is pivotally connected with the circuit board 18 by installing a pivotal component 38 such as a rivet at the connection place of the two inflexible sensing arms 36 and the fixed arm 30. The pivotal component 38 passes through the Y-shaped metal strip 26 and is pivotally connected with the circuit board 18 so that the Y-shaped metal strip 26 can rotate on the circuit board 18. A metal piece 32 is disposed on each of the two inflexible sensing arms 36. The conducting strip 34 is disposed below the Y-shaped metal strip 26 and between the two inflexible sensing arms 36. The conducting strip 34 is also fixed on and electrically connected with the circuit board 18. When the digital camcorder is rotated for 70 to 110 degrees, the Y-shaped metal strip 26 will rotate downwards and the metal piece 32 on one of the two inflexible sensing arms 36 will touch the conducting strip 34 due to its weight to form a closed circuit and send out a signal to the processor 20. The processor 20 bases on this signal to know the digital camcorder has been rotated.

To sum up, the present invention provides a rotation sensor, whereby when the body of a digital camcorder is rotated, one sensing arm of a Y-shaped strip will touch a conducting strip due to gravity to form a closed circuit and send out a signal. Whether the device body is in the horizontal or vertical state can thus be accurately and quickly determined based on this signal when photographing. Moreover, the detection is accomplished through gentle deformation or rotation of the sensing arm. Therefore, there will be no noise during detection, and there will be no noise when the digital camcorder records sound. Furthermore, as compared with the conventional rolling bead type rotation sensor, the present invention has a simple structure, a low manufacturing cost and a low material cost. The digital imaging device equipped with the rotation sensor of the present invention thus is highly competitive in price.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A rotation sensor system disposed inside a digital imaging device having a processor, said rotation sensor system being capable of detecting the rotation state of said digital imaging device when said digital imaging device is capturing a picture, said rotation sensor system comprising:
   a processor mounted on a circuit board;
   a rotation sensor electrically coupled to said circuit board for sensing a rotation of said circuit board; said rotation sensor including:
      a Y-shaped strip having two sensing arms and a fixed arm for connecting said two sensing arms, a metal piece being disposed on each of said two sensing arms, said sensing arms being made of an electrically conductive material, wherein a first end of said fixed arm is integrally connected to an end of each of said two sensing arms and a second end of said fixed arm is fixedly disposed in said digital imaging device, said second end being electrically connected to said circuit board; and
      a conducting strip disposed between said two sensing arms, said conducting strip being fixedly disposed in said digital imaging device and electrically connected to said circuit board, said Y-shaped strip and said conducting strip forming a closed circuit to send out a signal to said processor when one of said metal pieces on one of said two sensing arms touches said conducting strip, said processor thereby determining the rotation state of said digital imaging device based on said signal.

2. The rotation sensor as claimed in claim 1, wherein said Y-shaped strip is pivotally disposed in said digital imaging device.

3. The rotation sensor as claimed in claim 2, wherein said two sensing arms of said Y-shaped strip are made of inflexible material.

4. The rotation sensor as claimed in claim 1, wherein said fixed arm of said Y-shaped strip is fixedly disposed in said digital imaging device.

5. The rotation sensor as claimed in claim 1, wherein said two sensing arms of said Y-shaped strip are made of elastic material.

6. The rotation sensor as claimed in claim 1, wherein said Y-shaped strip is made of metal material.

7. The rotation sensor as claimed in claim 1, wherein said metal pieces are composed of zinc, aluminum, or copper.

8. The rotation sensor as claimed in claim 1, wherein said processor determines that said photography device has been rotated for 70 to 110 degrees based on said signal.

9. The rotation sensor as claimed in claim 1, wherein a circuit board is further disposed in said digital imaging device for installation of said rotation sensor.

10. The rotation sensor as claimed in claim 1, wherein said digital imaging device is a mobile phone, a digital camera, or a digital camcorder.

* * * * *